United States Patent [19]
Takegawa et al.

[11] Patent Number: 5,129,233
[45] Date of Patent: Jul. 14, 1992

[54] AUTOMATIC OPERATION CONTROL SYSTEM FOR AIR CONDITIONER

[75] Inventors: Hirozo Takegawa, Osaka; Hisashi Kodama, Ikoma, both of Japan

[73] Assignee: Matsushita Electric Industrial Co., Ltd., Osaka, Japan

[21] Appl. No.: 617,800

[22] Filed: Nov. 26, 1990

[30] Foreign Application Priority Data

Nov. 27, 1989 [JP] Japan .................................. 1-307027

[51] Int. Cl.⁵ .............................................. F25B 13/00
[52] U.S. Cl. .......................................... 62/160; 62/231
[58] Field of Search .................. 165/12, 26; 236/46 R; 62/231, 229, 160

[56] References Cited

U.S. PATENT DOCUMENTS

| | | | |
|---|---|---|---|
| 4,632,177 | 12/1986 | Beckey | 165/26 X |
| 4,655,279 | 4/1987 | Harmon, Jr. | 165/12 |
| 4,683,939 | 8/1987 | Levine | 165/26 |

*Primary Examiner*—William E. Wayner
*Attorney, Agent, or Firm*—Pollock, VandeSande & Priddy

[57] ABSTRACT

A control system for use in an air conditioner including a room heat-exchanger and an outside heat-exchanger. For controlling the room temperature, the control system sets a plurality of cooling start temperatures and a plurality of heating start temperatures and compares the room temperature, sensed by a temperature sensor, with the plurality of cooling start temperature and the plurality of heating start temperatures so as to control the outside heat-exchanger in accordance with the comparison results. The plurality of cooling or heating start temperatures includes a first cooling or heating start temperature and a second cooling or heating start temperature lower or higher than the first cooling start temperature. The control system first performs the temperature control on the basis of the first cooling or heating start temperature and then controls it on the basis of the second cooling or heating start temperature under predetermined conditions.

4 Claims, 5 Drawing Sheets

5,129,233

AUTOMATIC OPERATION CONTROL SYSTEM FOR AIR CONDITIONER

BACKGROUND OF THE INVENTION

The present invention relates to a control system for automatic operation of an air conditioner.

Control for automatic operation of air conditioners is generally effected such that cooling and/or heating is made in accordance with the results of comparison between the room air temperature and/or outside air temperature and a predetermined reference temperature. In such a control system, there is a problem, however, in that difficulty is encountered to adequately control the temperature on the basis of one predetermined reference temperature throughout all seasons because the heat-radiation states at the respective seasons are different from each other. For instance, in the case of setting the reference temperature to 28° C. for cooling, the temperature "28° C." is felt cool at the beginning of summer but felt hot at the late summer. Thus, a further improvement for required from the viewpoint of adequate air-conditioning to the respective seasons.

SUMMARY OF THE INVENTION

It is therefore an object of the present invention to provide an automatic operation control method for air conditioners which is capable of not only adequately performing the air conditioning control throughout all seasons but also meeting demands for energy savings.

In accordance with the present invention, for controlling the room temperature, the control system sets a plurality of cooling start temperatures and a plurality of heating start temperatures and compares the room temperature, sensed by a temperature sensor, with the plurality of cooling start temperature and the plurality of heating start temperatures so as to control the outside heat-exchanger in accordance with the comparison results. The plurality of cooling or heating start temperatures includes a first cooling or heating start temperature and a second cooling or heating start temperature lower or higher than the first cooling start temperature. The control system first performs the temperature control on the basis of the first cooling or heating start temperature and then controls it on the basis of the second cooling or heating start temperature under predetermined conditions.

BRIEF DESCRIPTION OF THE DRAWINGS

The present invention will be described in further detail with reference to the accompanying drawings, in which.

DETAILED DESCRIPTION OF THE INVENTION

Figure 1:
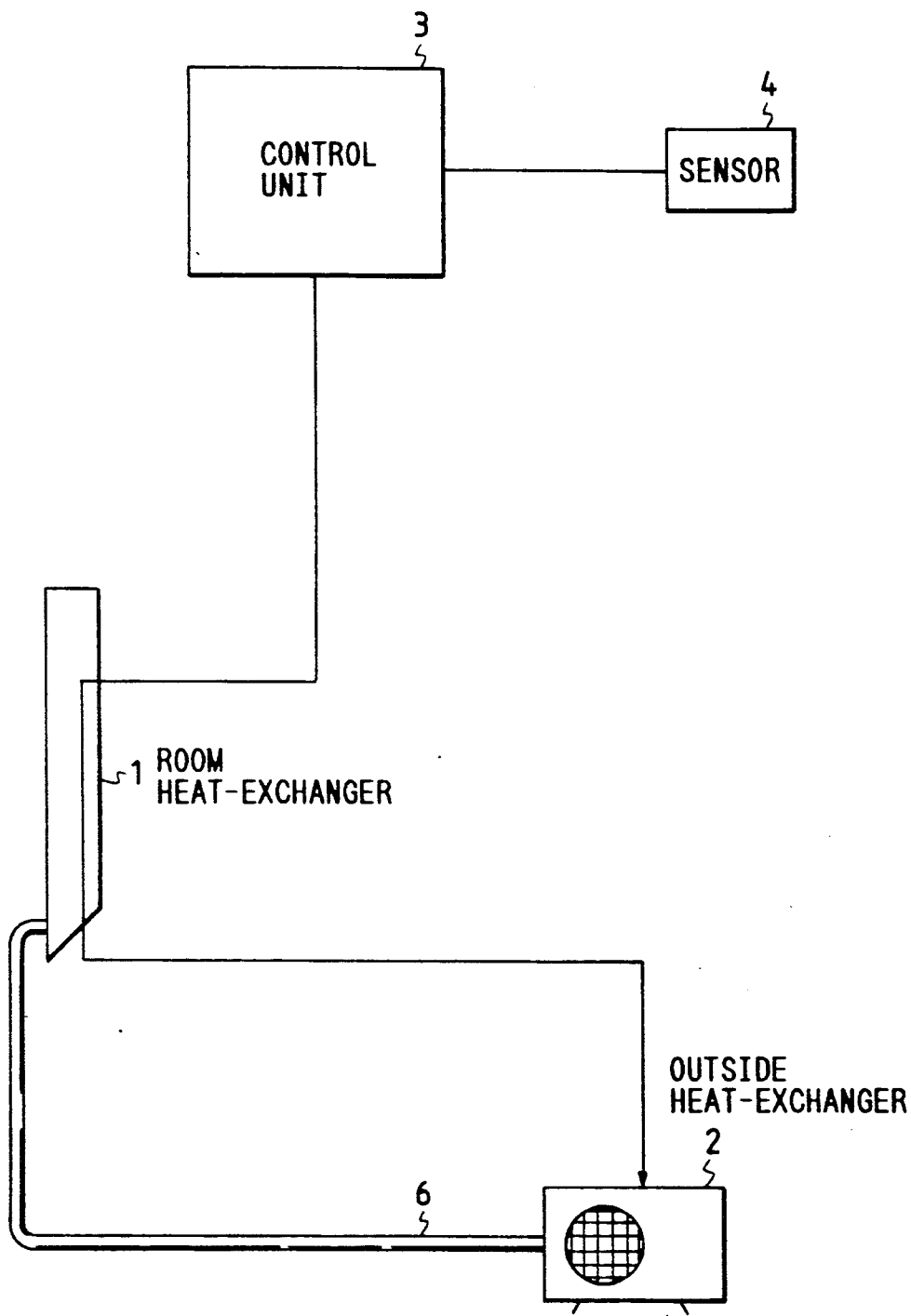
FIG. 1 is a block diagram showing a control system according to a first embodiment of the present invention which is incorporated into an air conditioner.

Referring now to FIG. 1, there is illustrated a control system according to a first embodiment of the present invention which is incorporated into an air conditioner that comprises a room heat-exchanger, illustrated at numeral 1, provided in a room to be temperature-controlled and an outside, heat-exchanger, illustrated at numeral 2, provided at the outside of the room. The room heat-exchanger 1 and the outside heat-exchanger 2 are coupled to each other through a passage 6 for heat medium circulation, and the outside heat-exchanger includes a compressor which is responsive to a temperature-control signal from an external unit for room temperature controlling operation. The control system is equipped with a control unit, which may be constructed of a known microcomputer comprising a central processing unit (CPU) and memories such as a ROM and a RAM, for outputting a temperature-control signal to the outside heat-exchanger 2 which in turn, performs the room temperature control (cooling or heating) in accordance with the temperature-control signal therefrom. Also included in the control system is a temperature sensor 4 for sensing a temperature int he room to be temperature-controlled. The control system 3 produces the temperature-control signal on the basis of the sensed room temperature and outputs it to the compressor of the outside heat-exchanger 2.

Figure 2:
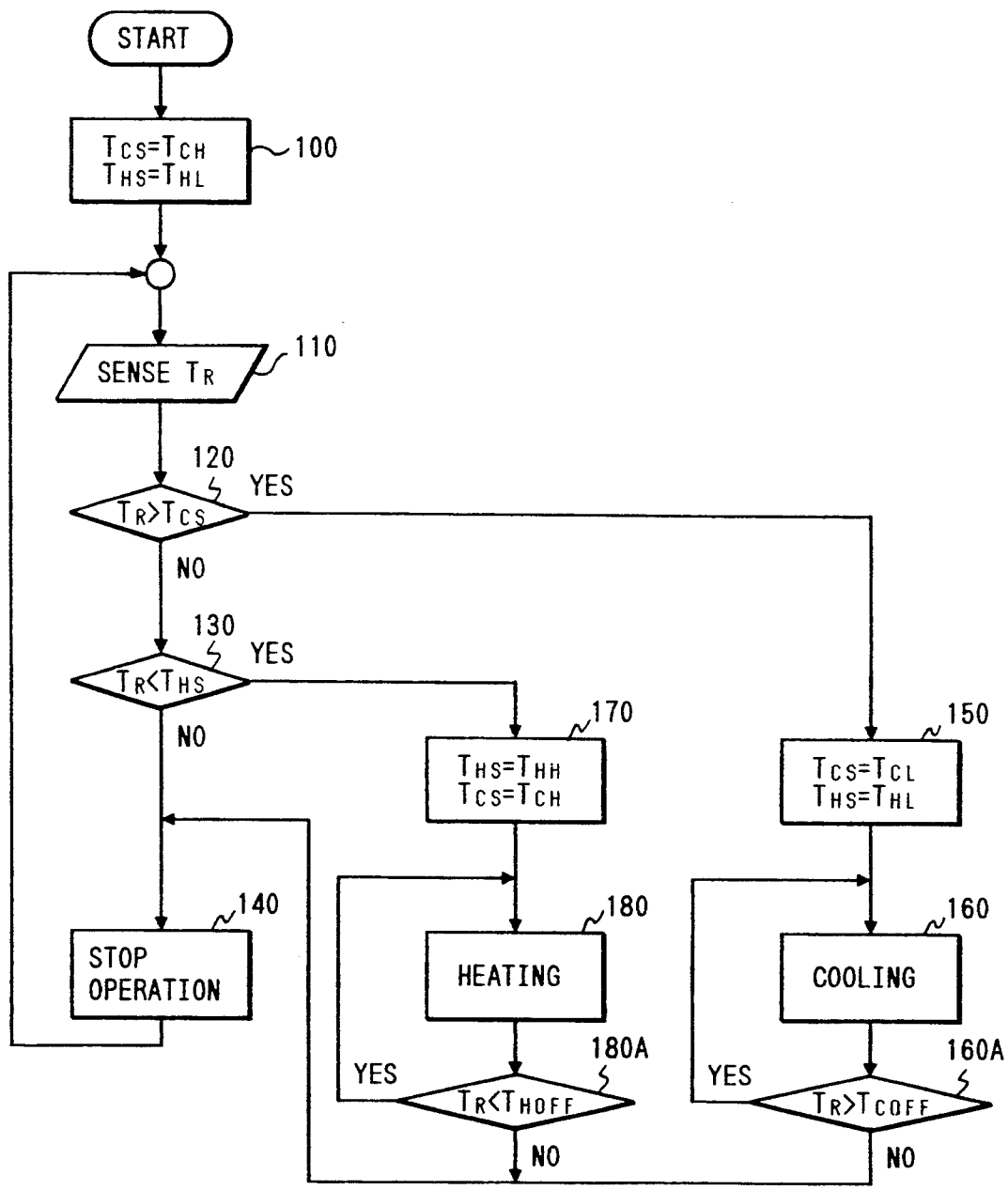
FIG. 2 is a flow chart showing an operation of the control system illustrated in FIG. 1.
Figure 3:
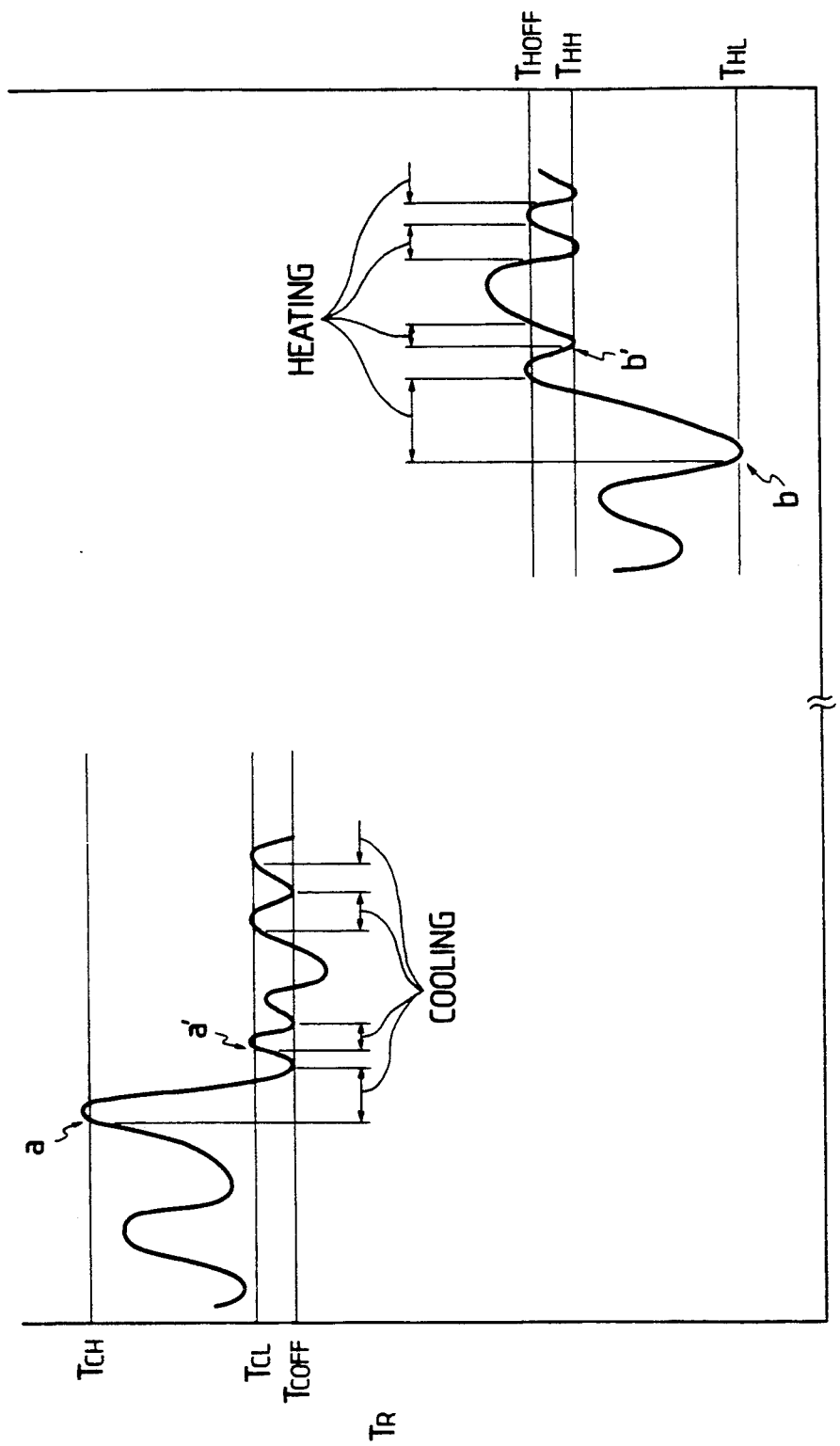
FIG. 3 is a graphic illustration for describing one example of the results of the operation executed in accordance with the FIG. 2 flow chart.

Operation of the control unit 3 will be described hereinbelow with reference to a flow chart of FIG. 2 and a timing chart of FIG. 3. In FIG. 2, the operation starts with a step 100 to set the cooling start temperature $T_{CS}$ and the heating start temperature $T_{HS}$ to predetermined temperatures $T_{CH}$ and $T_{HL}$, respectively, and then followed by a step 110 to sense the room temperature $T_R$ by means of the temperature sensor 4. This room temperature sensing may be effected at every 15 minutes for example. A step 120 follows in order to check whether the sensed room temperature $T_R$ is higher than the cooling start temperature $T_{CS}$ (here, $T_{CH}$). If the answer in the step 120 is negative, control goes to a step 130 to check whether the sensed room temperature is lower than the heating start temperature $T_{HS}$ (here, $T_{HL}$). If the answer in the step 130 is negative, control advances to a step 140 so as to stop the operation of the air conditioner. On the other hand, if the answer in the step 120 is affirmative, control goes to a step 150 to set the cooling start temperature to a predetermined temperature $T_{CL}$ lower than the first-set cooling start temperature $T_{CH}$. After the execution of the step 150, control advances to a step 160 so as to start the cooling operation (a, a' in FIG. 3). After the step 160, a step 160A follows to sense the room temperature $T_R$ so as to check whether the sensed room temperature is higher than a predetermined temperature $T_{COFF}$. If the answer in the step 160A is affirmative, the operational flow returns to the previous step 160. If negative, the operational flow directs to the operation-stopping step 140. Further, if the answer in the step 130 is affirmative, control goes to a step 170 so as to set the heating start temperature $T_{HS}$ to a predetermined temperature $T_{HH}$ higher than the first-set heating start temperature $T_{HL}$, and then followed by a step 180 to start the heating operation (b, b' in FIG. 3). After the step 180, a step 180A follows to sense the room temperature $T_R$ so as to check whether the sensed room temperature $T_R$ is lower than a predetermined temperature $T_{HOFF}$. If affirmative, the operational flow returns to the previous step 180, and if negative, the operational flow goes to the operation-stopping step 140. With repetition of these operations (which will be performed until execution of the next control, that is, until in the step 110 the room temperature $T_R$ is sensed by the temperature sensor 4), the room temperature can be controlled as illustrated in FIG. 3.

Figure 4:
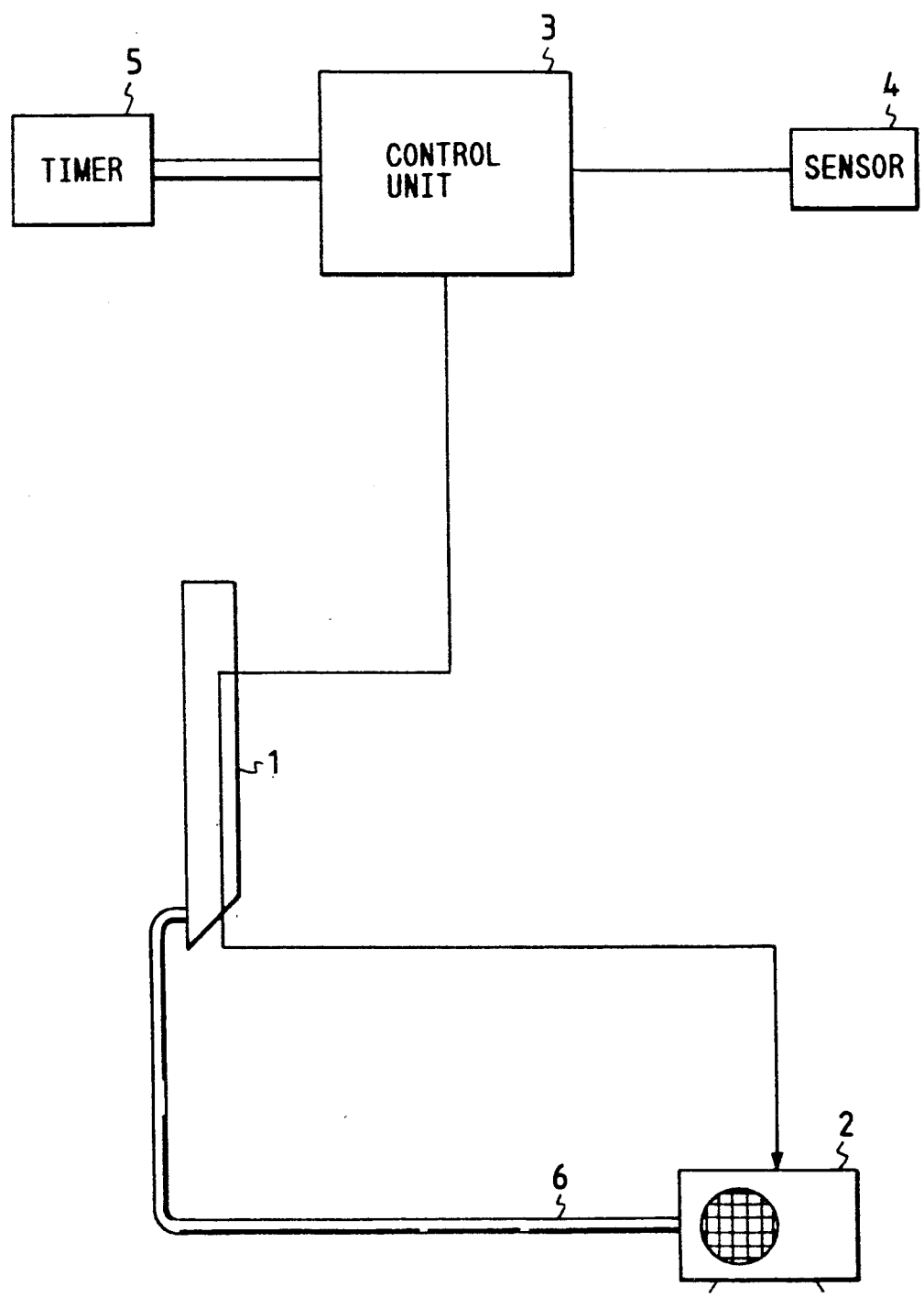
FIG. 4 is a block diagram showing a control system according to a second embodiment of the present invention which is incorporated into an air conditioner.

FIG. 4 is a block diagram showing a control system according to a second embodiment of this invention which is incorporated into an air conditioner, where parts corresponding to those in FIG. 1 are marked with the same numerals and the description thereof will be omitted for brevity. In FIG. 4, in the control system there is provided a timer 5 which is coupled to a control unit 3 so as to be responsive to a timer start signal from the control unit 3 and supply the count results to the control unit 3.

Figure 5:
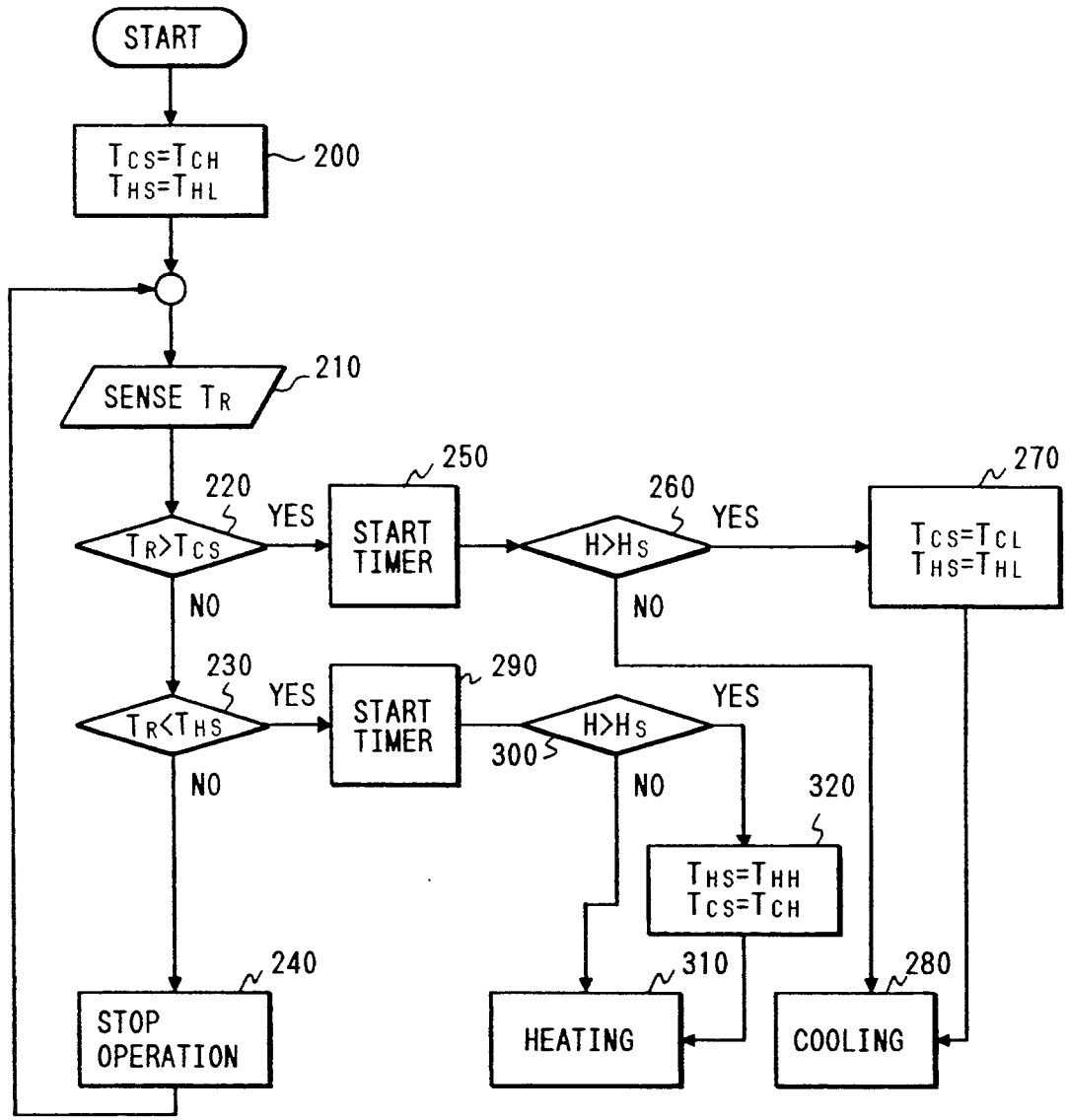
FIG. 5 is a flow chart showing an operation to be executed by the control system illustrated in FIG. 4.

Operation of the FIG. 4 control system will be described hereinbelow with reference to a flow chart shown in FIG. 5. In FIG. 5, the operation starts with a step 200 to set the cooling start temperature $T_{CS}$ and the heating start temperature $T_{HS}$ to predetermined temperatures $T_{CH}$ and $T_{HL}$, respectively, and then followed by a step 210 to sense the room temperature $T_R$ by means of a temperature sensor 4. Similarly, this room temperature sensing may be effected at every 15 minutes for instance. A step 220 follows in order to check whether the sensed room temperature $T_R$ is higher than the cooling start temperature $T_{CS}$ (here, $T_{CH}$). If the answer in the step 220 is negative, control goes to a step 230 to check whether the sensed room temperature is lower than the heating start temperature $T_{HS}$ (here, $T_{HL}$). If the answer in the step 230 is negative, control advances to a step 240 so as to stop the operation of the air conditioner. On the other hand, if the answer in the step 220 is affirmative, that is, when $T_R > T_{CS}$, control goes to a step 250 to start the operation of the timer 5 and count the time (integrated time) H that the sensed room temperature $T_R$ exceeds the cooling start temperature $T_{CS}$ (=$T_{CH}$). In a subsequent step 260, this count value H is compared with a predetermined reference value (time) $H_S$ in advance stored in a memory of the control unit 3. If not (H $\leq H_S$), control goes to a step 280 to start the cooling operation. If so (H $\geq H_S$), in a step 270, the cooling start temperature $T_{CS}$ is set to a predetermined temperature $T_{CL}$, then followed by the above-mentioned cooling start step 280. Similarly, if the answer in the step 230 is affirmative, control goes to a step 290 to start the timer 5 to count the time (integrated time) H that TR <$T_{HS}$, and then followed by a step 300 in order to check whether H >$H_S$. If not, control goes to a step 310 to start the heating operation. If not, control proceeds to a step 320 to set the heating start temperature $T_{HS}$ to a predetermined temperature $T_{HH}$, then followed by the heating start step 310. These operations will be repeated until the next control. Here, in FIG. 5, the comparison steps corresponding to the steps 160A and 180A in FIG. 2 are omitted.

It should be understood that the foregoing relates to preferred embodiments of the present invention, and that it is intended to cover all changes and modifications of the embodiments of the invention herein used for the purposes of the disclosure, which do not constitute departures from the spirit and scope of the invention.

What is claimed is:

1. A control system for use in an air conditioner including a room heat-exchanger provided in a room to be temperature-controlled by said air conditioner and an outside heat-exchanger provided outside of said room, said outside heat-exchanger including compressor means whose operation is controllable in accordance with a temperature control signal, said control system comprising:

temperature sensor means for sensing a temperature in said room;

control means responsive to the room temperature sensed by said temperature sensor means and arranged to output said temperature control signal to control said compressor means of said outside heat-exchanger in accordance with the comparison results of the sensed room temperature with a plurality of predetermined cooling start temperatures and further with a plurality of predetermined heating start temperature, said plurality of cooling start temperatures including at least a first cooling start temperature and a second cooling start temperature lower than said first cooling start temperature, said control means first controlling said compressor means in accordance with the results of the comparison between said first cooling start temperature and the sensed room temperature and then controlling said compressor means in accordance with the results of the comparison between said second cooling start temperature and the sensed room temperature; and timer means for starting counting operation when the sensed room temperature attains a predetermined relationship with said first cooling start temperature, and wherein said control means changes the cooling start temperature from said first cooling start temperature to said second cooling start temperature when the count value of said timer means exceeds a predetermined value.

2. A control system as claimed in claim 1, wherein said control means stops the cooling operation when the sensed room temperature reaches a predetermined temperature.

3. A control system for use in an air conditioner including a room heat-exchanger provided in a room to be temperature-controlled by said air conditioner and an outside heat-exchanger provided outside of said room, said outside heat-exchanger including compressor means whose operation is controllable in accordance with a temperature control signal, said control system comprising:

temperature sensor means for sensing a temperature in said room;

control means responsive to the room temperature sensed by said temperature sensor means and arranged to output said temperature control signal to control said compressor means of said outside heat-exchanger in accordance with the comparison results of the sensed room temperature with a plurality of predetermined cooling start temperatures and further with a plurality of predetermined heating start temperatures, said plurality of heating start temperatures including at least a first heating start temperature and a second heating start temperature higher than said first heating start temperature, said control means first controlling said compressor means in accordance with the results of the comparison between said first heating start temperature and the sensed room temperature and then controlling said compressor means in accordance with the results of the comparison between said second heating start temperature and the sensed room temperature; and timer means for starting counting operation when the sensed room temperature attains a predetermined relationship with said first heating start temperature, and wherein said control means changes the heating start temperature from said first heating start temperature to said second heating start temperature when the count value of said timer means exceeds a predetermined value.

4. A control system as claimed in claim 3 wherein said control means stops the heating operation when the sensed room temperature reaches a predetermined temperature.

* * * * *